United States Patent Office 3,362,386
Patented Jan. 9, 1968

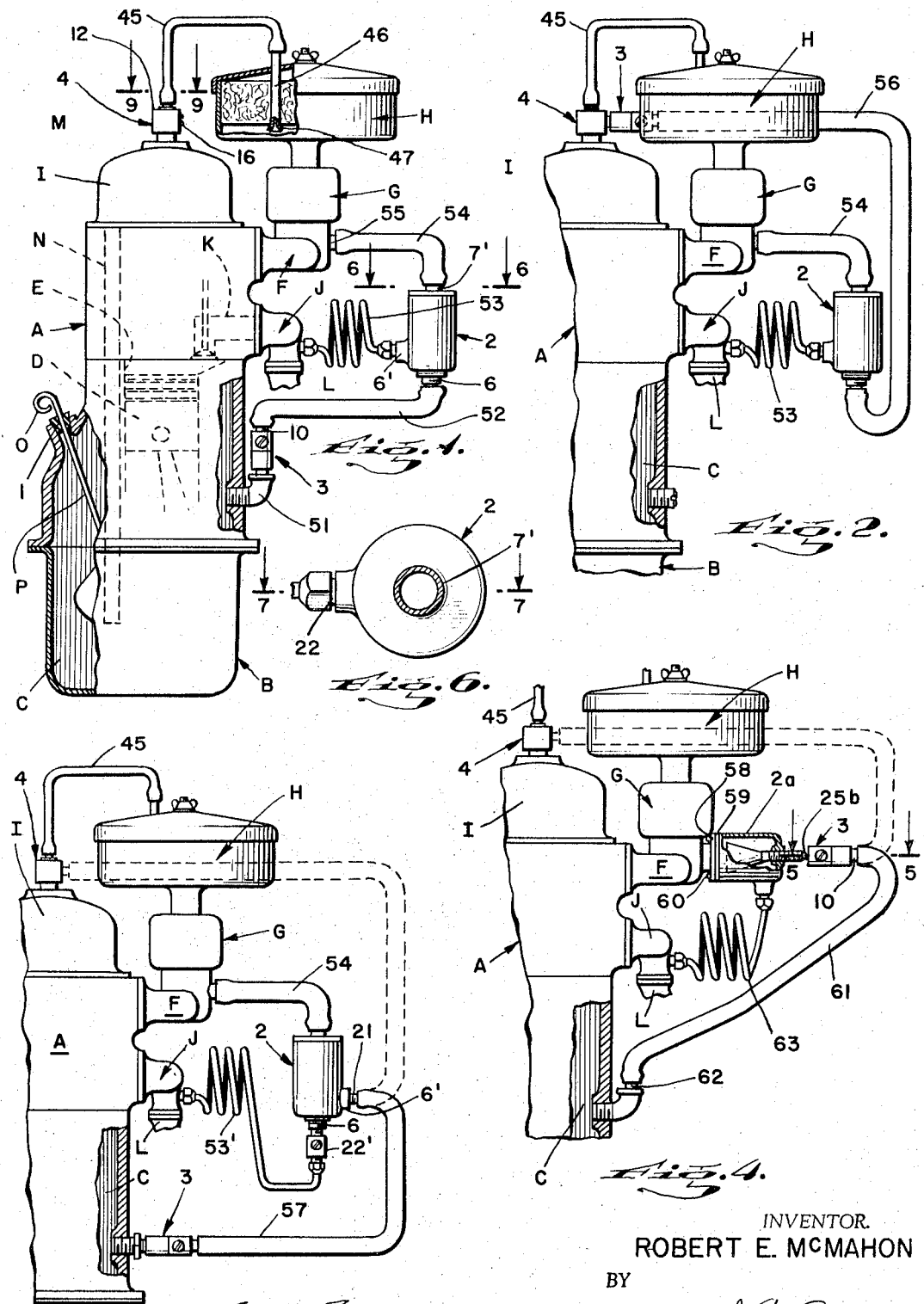

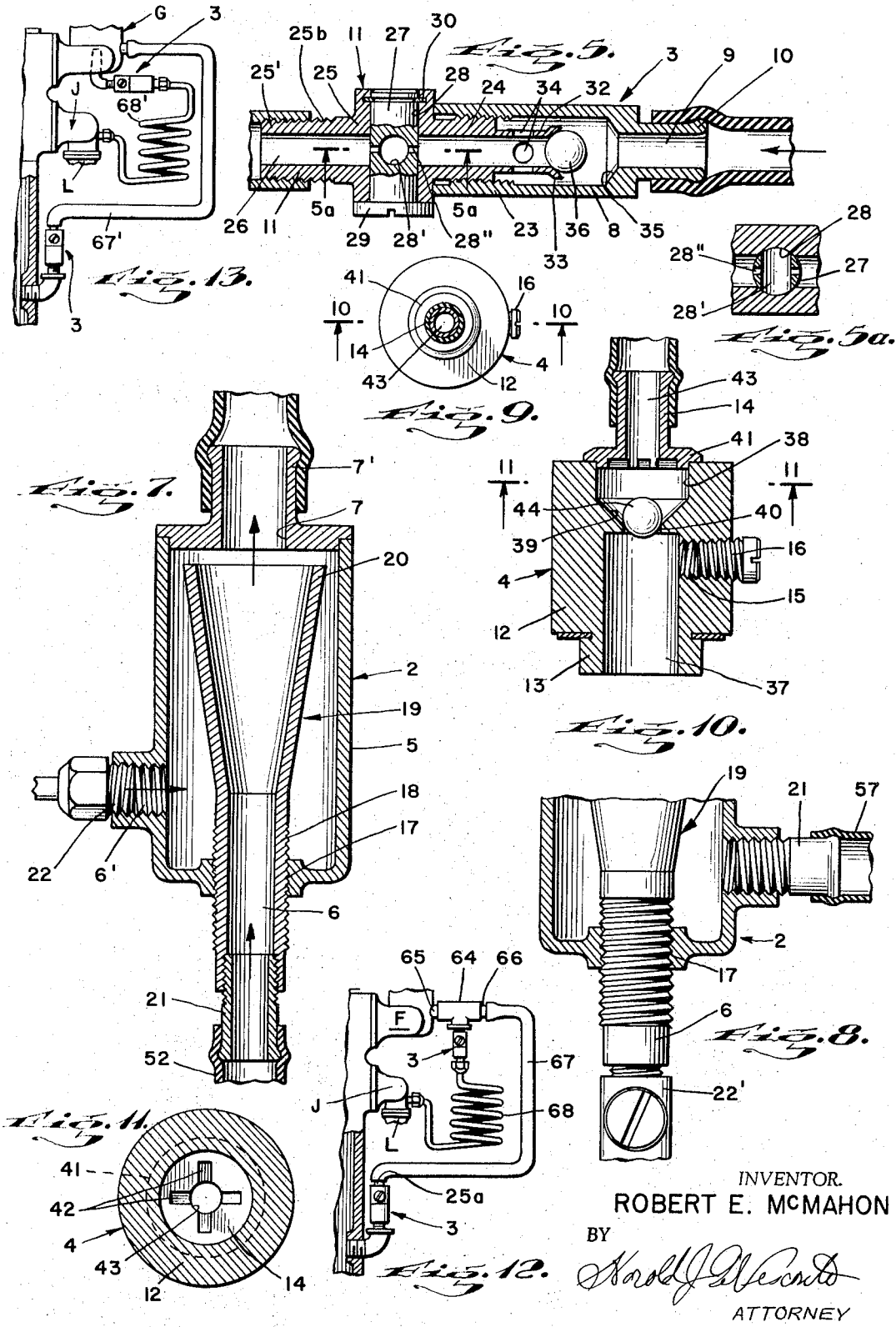

3,362,386
INTERNAL-COMBUSTION ENGINE
Robert E. McMahon, Santa Monica, Calif., assignor to McMahon, Binder & Huron, Los Angeles, Calif., a co-partnership
Filed May 17, 1965, Ser. No. 456,055
18 Claims. (Cl. 123—119)

ABSTRACT OF THE DISCLOSURE

An air pollution reduction means for internal-combustion engine exhaust in which the engine crankcase is sealed and the "blow-by" gases are drawn into the fuel intake with an intermixture of a portion of the exhaust gases.

---

The invention relates to internal-combustion engines and particularly to a novel structural arrangement associated therewith offering an improved mode of reducing undesirable products of combustion from engine exhaust. The result is to reduce importantly air pollution from this source. As an unexpected by-product the use of the invention has been found to significantly increase engine efficiency while increasing the useful life of the engine and decreasing the cost of upkeep thereof.

Since the advent of the post-World War II era, and the increased use of combustible products as power sources, the word "smog" has become the common generic name given to various types of air pollution. The relatively spectacular increase of air pollution in recent years has given rise to increasing concern as to its effect on the health of human beings as well as the health of other living organisms which play vital roles in existing social and economic conditions. Intense investigation of the various sources of air pollution has been undertaken. While both the known and suspected sources of air contamination are many, the present invention is concerned with a single but important source, namely, the products of combustion released to the atmosphere by internal-combustion engines.

Early efforts to understand and control air pollution from internal-combustion engine sources, related, to the elimination of crankcase fumes as a pollution source. In typical engine construction, the crankcase is provided with means (usually associated with the oil fill cap) to admit atmosphere to the crankcase and with a road draft tube arranged to permit the egress of crankcase fumes to atmosphere. For a more particular description of the contaminating effect of internal-combustion engine crankcase fumes and a novel mode of controlling same, attention is directed to my Patent No. 3,139,080 entitled, Internal Combustion Engine, and issued on June 30, 1964. As an aid to the more complete understanding of the herein disclosed invention the teaching of said patent is incorporated herein by reference.

As noted in said patent, prior art investigation into the internal-combustion engine as a source of air pollution related primarily to the dissipation from said engine of raw unburned gasoline in the vapor condition, commonly called hydrocarbons, and to the elimination from the engine of incomplete combustive products such as carbon monoxide. These by-products of engine operation are important sources of air pollution.

More recent investigation has uncovered more complex aspects of air pollution. For example, atmospheric air contains, approximately 20% oxygen and 80% nitrogen with other gases being found in trace amounts. During the combustion cycle of an internal-combustion engine, air is drawn from the atmosphere into a carburetor, mixed with an appropriate proportion of fuel, which is then in the form of a vapor and the mixture ignited to accomplish the desired combustion. A typical analysis of engine exhaust shows that the discharge to the atmosphere includes innocuous substances such as carbon dioxide and water as well as noxious substances such as carbon monoxide, hydrocarbons, and substances known as oxides of nitrogen. Only recently has the presence of these oxides of nitrogens and the deleterious effects thereof on living organisms become known and this knowledge has caused important concern.

When these nitrogen oxides are emitted into the atmosphere as components of engine exhaust and are brought into the presence of hydrocarbons and sunlight, a catalytic effect is induced instituting a complex series of chemical reactions which give rise to a multitude of specific pollutants such as ozone and nitrogen oxide compounds, many of which heretofore have not been known normally to occur in nature. A specific group of these relatively new pollutants are known as peroxyacylnitrates. Air pollutants such as these peroxyacylnitrates and others deriving from the thus emitted nitrogen oxides are commonly denominated PANS. From recent investigation of the smog problem it is now believed that the PANS are an extremely important element in the deleterious effect of smog both to plant and animal life. Specifically, they have been found to irritate and burn the eyes and nasal passages of human beings and have been found responsible for damage and death of plants and vegetable materials in many areas of the country. Obviously then the reduction and, so far as possible, the elimination from the exhaust gases of internal combustion engines both of nitrogen oxides and of unburned hydrocarbons present an important aspect of smog control.

With the foregoing considerations in mind, the present invention has as a principal objective the provision of means for the capture and utilization of all fumes which may be present in an internal combustion engine crankcase combined with a portion of the exhaust fumes from the engine exhaust manifold produced as a result of combustion within the engine and the return of the combined fumes to the intake manifold of the engine. The disclosed invention employs pressure differentials inherent in internal-combustion engine operation to provide the recirculation of said materials and thereby to effect a substantial reduction of exhaust to atmosphere of noxious materials such as unburned hydrocarbons, carbon monoxide and nitrogen oxides.

Specifically, the preferred embodiments of the disclosed invention contemplate a sealed system which creates in the engine crankcase a negative pressure condition which may be controllably set at any desired level below atmospheric within reasonable limits. In this aspect of the invention, direct elimination to atmosphere of crankcase fumes is positively prevented. Resultantly, there occurs a substantially complete reduction of the direct entrance of atmospheric air to the crankcase, except for minor leakage, with a consequent elimination from the crankcase lubricant of air-borne contaminants such as moisture, dirt, grit and the like. This inhibits the formation of lubricant contaminating sludge within the crankcase and consequent engine damage deriving from such sludge. A further particular feature of this aspect of the invention, involves the employment of controllable metering means whereby the negative pressure condition within the crankcase may be easily adjusted to accommodate variation in engine design, variation deriving from engine wear after long use, as well as variations due to pressure differentials incident to operation at greater or lesser altitudes.

A further aspect of the invention comprehends the capture, from the exhaust system of the engine, of a portion of the exhaust gases and the recirculation thereof in combination with the fumes captured from the engine crankcase. These combined gases are conducted to the intake manifold of the engine in which they are mixed with new fuel. This aspect of the invention also involves the employment of means to controllably vary the volumetric flow of the exhaust gases prior to combination with crankcase fumes and reintroduction thereof into the intake manifold of the engine. The effect is to proportion the exhaust and crankcase fumes for most efficient engine operation. This novel system also includes means to reduce the temperature of the exhaust gases prior to reintroduction into the intake manifold, resulting in a controlled preheating of the air-fuel combustion mixture with incident improved combustion as well as economy in engine operation.

The invention further contemplates, in some embodiments thereof, the use of a novel mixing chamber which receives both a portion of the exhaust gases and all of the crankcase fumes to effect both a thorough intermixture and heating thereof prior to introduction of the mixture into the intake manifold.

It is another object of the invention to employ, with an internal-combustion engine, an apparatus embodying the principles hereinafter described having the effect of significantly reducing the content of noxious materials such as carbon monoxide, hydrocarbons and nitrogen oxides from the exhaust gases while improving the combustion process within the engine.

It is a further object of the invention to provide an apparatus of the type described which complements fuel-air engine carburetion with a view to maximum engine efficiency in operation without addition of air other than that normally received through the carburetor intake.

Still another object of the invention is to provide an apparatus of the type described which effects increased engine service life by a reduction in what is usually considered normal wear and resultant failure of important operating engine parts.

Another and more detailed object of the invention is the employment, within the apparatus described, of means designed to prevent positive pressures developing in the crankcase as well as avoiding the combustion of igniting flame to the crankcase during engine operation as, for example, in the event of backfire.

It is still a further specific object of the invention to provide, in the apparatus described, means to vary the proportions of the combined exhaust gases and crankcase fumes which are thus returned to the intake manifold.

It is yet a more specific object of the invention to provide an apparatus of the type described that may be readily adapted to and easily installed on both new and existing internal-combustion engines.

It is still a further object of the invention to provide apparatus of the type described which is simple in construction, composed of relatively few parts, and which is economical to manufacture, is readily installed, and reliable in use.

With the foregoing objects in view, together with such additional objects and advantages as may subsequently appear, the invention resides in the parts, and in construction, combination and arrangement of parts described by way of example, in the following specification of certain presently preferred embodiments of the invention, reference being had to the accompanying drawings which form a part of said specification, and in which drawings:

FIG. 1 is a partially sectional, schematic and elevational view of a typical internal-combustion engine having associated therewith apparatus constituting a first embodiment of the invention, FIGS. 2, 3 and 4 are fragmentary views generally like FIG. 1 but constituting modifications of the embodiment of FIG. 1, FIG. 5 is an enlarged scale, fragmentary sectional view taken on the line 5—5 of FIG. 4, FIG. 5a is a fragmentary view showing the valve means illustrated in FIG. 5 rotated to its "closed" position, FIG. 6 is an enlarged scale, fragmentary sectional view taken on the line 6—6 of FIG. 1, FIG. 7 is an enlarged scale, medial sectional view taken on the line 7—7 of FIG. 6, FIG. 8 is a fragmentary, side elevational, sectional view of the mixing chamber component, said view being generally similar to the lower portion of FIG. 7, but showing the connections for receiving the crankcase fumes and the exhaust gases reversed from the connections shown in FIG. 7, FIG. 9 is an enlarged scale, top plan view, partially in section, taken on the line 9—9 of FIG. 1, FIG. 10 is a medial longitudinal sectional view taken on the line 10—10 of FIG. 9, FIG. 11 is a transverse sectional view taken on the plane of the line 11—11 of FIG. 10, FIG. 12 is a fragmentary view similar to FIGS. 1-4 but modified to show a usable but less satisfactory embodiment characterized by the elimination of the mixing chamber shown in FIGS. 1-4, and FIG. 13 shows another usable embodiment in which, as in FIG. 12, the mixing chamber is eliminated.

Referring first to FIG. 1, one embodiment of the invention is shown as applied to an overhead valve type of engine, but it will be understood that the invention herein disclosed may be adapted to any of the various forms of spark ignition internal-combustion engine employed today. The engine comprises a block A having a pan B conventionally secured thereto by means (not shown) on the under side thereof. The pan B combines with the lower portion of the block A to define a crankcase chamber C. Though not here shown because conventional structure is involved, it will be understood that the crankcase houses the usual eccentrically weighted crankshaft having appropriate connecting rods interconnecting said shaft and a plurality of pistons, one of which is indicated at D. The respective pistons D are housed in the usual manner in the upper aspect of the block A and reciprocate within cylinders E, each of said cylinders terminating beyond the head of the contained piston in a conventional combustion chamber as is well known to those skilled in the art.

Externally of the block A, an intake manifold indicated generally at F is provided. The intake manifold F further mounts, and is in communication with the downstream side of conventional carburetion means indicated at G. The carburetion means G in turn, carries, at the intake side thereof, the usual air cleaner, indicated generally at H and here shown in medial sectional side elevation. It will be understood that the air cleaner H is provided with the usual cylindrical filter element, through which air must pass enroute to the ingress port of the carburetion means G. A valve cover I houses the usual rocker arm valve structure (not shown) found in this type of engine.

The block A has an exhaust manifold, indicated generally at J, mounted on the side thereof to which the intake manifold is attached, said exhaust manifold being in communication via block passage K, with the described combustion chamber. Appropriate piping structure, as fragmentarily shown at L may be arranged in communication with the exhaust manifold J to carry the exhaust fuel-air mixture to atmosphere via appropriate muffler structure (not shown) all in the conventional manner. The valve cover I, at the upper aspect of the engine, is provided with a conventional oil filler opening M to provide a means for filling the crankcase with lubricating oil. In view of the fact that communication between the oil filler opening M and the crankcase chamber C in conventional engines is established by virtue of a plurality of tortuous paths internally cast in the block A, a schematic pipe here shown by the dotted lines at N is used to illustrate this conventional construction and communication. The present invention comprehends a sealed system, and therefore, the usual dip stick opening O is sealed as will presently be described.

The principal components of the invention, and which in one form or another employed in the embodiments of the invention shown in FIGS. 1, 2 and 3 comprise a plug 1 surrounding the dip stick P and sealing the opening O through which the dip stick is inserted and removed to ascertain the crankcase oil level, the mixing chamber unit 2, the combined check and metering valve unit 3 and the closure means or cap 4 for the crankcase oil fill tube. The mixing chamber component 2a employed in the embodiment of FIG. 4 will be separately described although the other components are identical.

The mixing chamber unit 2, comprises an elongated, hollow, cylindrical body 5 having an inlet port means 6 in one end thereof and a second inlet port 6' extending through the side wall thereof. The opposite end of the unit comprises a removable cover and outlet port means 7 which terminates in a hose nipple means 7' for connection to the intake manifold as shown in FIGS. 1, 2 and 3 or the cover may be formed by a flange surrounding an opening in the side wall of the intake manifold as shown in FIG. 4 and to which detailed reference will be made.

The unit 3 (see FIG. 5) includes a first body portion 8 which houses the check valve means and which is provided with an inlet port 9 which may be externally threaded as shown in FIGS. 1, 2, 3 and 12 or comprise a hose nipple as shown at 10 in FIGS. 4 and 5. The opposite end of the body portion 8 is internally threaded for connection to the inlet end of the body of the manually adjustable metering valve means 11.

The oil fill tube cap unit 4 includes a generally cylindrical body 12 having a passage extending axially therethrough to be later described in detail. One end of said body is reduced in external diameter as at 13 to provide a tight friction fit with the interior of the engine oil fill tube and the axial bore through said cap unit constitutes an inlet port for receiving crankcase gases. The opposite end of said body carries a hose nipple means 14 constituting one outlet port and the side wall of said body is provided with a second outlet port 15 which may be either closed by a plugscrew 16 or be connected to one of the inlet ports of the mixing chamber 2 as will presently be described.

The end wall of the mixing chamber body 5 having the inlet port 6 is internally threaded as at 17 and threadedly engaging these threads is the hollow shank 18 of a diffusing element 19 which is formed as an integral part of the shank end 18 and extends in a frusto-conical configuration on the axial line of said shank to an enlarged end 20 disposed adjacent to the inner face of the cover element 7. The diffusing element 19 is adjustable toward and away from said inner face of the cover by the said threaded engagement with the body end portion in which the shank is mounted. The outer end of the shank 18 extends beyond the end of the mixing chamber body and is internally threaded for optional engagement by a hose nipple 21 or by a metal tubing connecting means 22 or an interposed valve means 22' to be later described. The port 6' affords communication with the interior of the mixing chamber body space which is exterior to the diffusing element 19 and this port is internally threaded identically with the internal threads of the exposed end of the shank 18 to likewise afford means for optional engagement by the hose nipple 21 or the tubing connector 22 affording outlet connection for a cooling coil to be presently described and which supplies the proportion of the exhaust gases which are combined in the mixing chamber product.

The outlet end 23 of the body portion 8 is internally threaded to receive the externally threaded inlet end 24 of the body 25 of the metering valve means 11, the said body of which includes an outlet end 25 which may be either a hose nipple 25a (FIGS. 1, 2, 3 and 12) or be threaded as at 25b in FIGS. 4 and 5. The body 25 has a longitudinal passage 26 extending therethrough, said passage being interrupted by a manually adjustable valve comprising a transversely extending, cylindrical, valve element 27 rotatable in a bore 28 which intersects the passage 26 and said valve element being held against endwise movement in said bore by the opposed faces of a head 29 having a screwdriver slot at one end and a snap ring 30 engaging a complementary groove in the other end of the valve element and engaging a face on the body 25 opposing the face engaged by the head 29. The body of the valve member is provided with a first transverse bore 28' disposed in the line of the passage 26 and of at least substantially the same size as said passage whereby rotation of the valve member to selected positions will vary the opening through the valve member and control the rate of flow of gases through the unit. Additionally, the valve member body is provided with a second and smaller passage 28'' disposed at right angles to and intersecting the bore 28' serving to prevent complete closure of the valve member.

The threaded end 24 of the valve unit includes a reduced diameter end portion 32 which projects into the interior of the check valve body member 8, said end portion terminating in a frusto-conical valve seat portion 33. The side walls of said reduced diameter end portion are provided with a plurality of openings 34 formed therein. The opposed inner end of the body member 28 is formed as a second frusto-conical valve seat 35 disposed in axial alignment with the valve seat 33 and spaced therefrom in the said axial line. A light weight check ball 36 is loosely retained in the cavity in the body member 8 between the valve seats 33 and 35.

The oil fill tube cap unit body member 12 is provided with an axial bore 37 extending through the end 13 into the body member to a point beyond the intersection therewith of the port 15. A second axial bore 38 extends from the opposite end of the body 12 and terminates in a frusto-conical valve seat portion 39 the minor diameter of which is formed by a reduced diameter bore 40 which affords communication with the bore 37. The hose nipple means 14 terminates in an enlarged end 41 closing the outer end of the bore 38 and the end face of said hose nipple means within the bore 38 is provided with a series of radially extending grooves 42 which communicate with the axial bore 43 extending through said hose nipple means 14. A light weight check ball 44 is retained in the cavity formed by the bore 38, the valve seat 39 and the end face of the hose nipple means. A flexible conduit means 45 connects the hose nipple 14 with a tube 46 mounted in and extending through the removable cover of the air cleaner H and thence extending through the filter element thereof to a discharge end 47 disposed downstream of the filter element to deliver any oil laden gaseous matter received through the oil filler cap into the carburetor intake without having contaminated the filter unit (see FIG. 1), it being noted that the use of the flexible hose 45 permits the cap 4 to be removed to replenish crankcase oil and the removal of the filter cover.

Having described the various components in detail, the various modes of connection or installation of the invention on an engine will be considered by way of illustrating the point that the principles of the invention can be applied in a number of ways as may best be suited to the form of engine and its environment as well as to the condition of the engine. Referring first to FIG. 1, the mixing chamber 2 is shown mounted so that the end intake port 6 thereof is connected to the opening in the crankcase side wall to which the road draft tube (which is discarded) had been connected; the connection for the present invention comprising an elbow fitting 51 in said opening with the inlet end of the check valve and metering valve of unit 3 threadedly engaging the outlet end of the elbow. The outlet end 10 of unit 3 is connected by a hose 52 to the hose nipple 21 screwed into the exposed end 18 of the diffusing element 19. A small metal tube 53 extends between a convenient point in the engine exhaust system (here shown as extending from the manifold J) and the side port 6' of the mixing chamber 2, said tube including several convolutions to give it sufficient length so that it may act both as a heat exchanger and, in the event of backfire, as a flame arrester and serving to somewhat cool the exhaust gases conducted into the mixing chamber 2. The outlet end 7' of the mixing chamber is connected by a hose 54 to a hose nipple 55 projecting from the inlet manifold F at a point thereon closely adjacent the point of attachment of the carburetor G thereto.

The vacuum in the intake manifold is constantly tending to exacuate the crankcase to the extent permitted by the adjustment of the valve 27 with the thus evacuated gases being heated and mixed with the portion of the exhaust gases received through tube 53 to the extent determined by the adjustment of the end 20 of the diffusing member 19 to the adjacent end wall of the mixing chamber and the combined crankcase fumes and exhaust gases are thus recirculated by being combined with the incoming new fuel mixture.

While as above stated, the length of the tube 53 is ordinarily sufficient to serve as a flame arrester, the check ball 36 serves at all times to prevent ignition of fumes within the crankcase. Repeated experiments have been demonstrated conclusively that the addition of the small proportion of the hot exhaust gases to the crankcase fumes thus introduced into the fuel mixture results in a substantial reduction of the proportion of PANS producing components in the exhaust gases.

The exact nature of the thermo-chemical reactions of the combustion process resulting from the use of devices embodying the invention is not known, but tests have been conducted by a qualified laboratory of which the following report is representative to demonstrate the practical utility of the invention.

"The car was operated from a hot start on the chassis dynamometer in accordance with the California exhaust testing procedure. (See booklet entitled, 'California Exhaust & Testing Procedure.') A proportional sample of exhaust gas from two warmed-up 7-mode cycles was collected in a Mylar bag. During the first test the device was connected and reportedly functioning in a normal manner. A second test was conducted in exactly the same manner after the sponsor had disconnected the device and reset the idle speed."

Analyses of the proportional bag sample for total oxides of nitrogen by a modified Saltzman method resulted in the following data, corrected to 15% $CO+CO_2$.

| Condition: | Total $NO_x$ in raw exhaust, p.p.m. |
|---|---|
| Device connected | 695 |
| Device disconnected (baseline) | 1264 |
| Reduction (percent) | 45 |

In some engines the locations of the breather tube orifice and oil fill tube cap are such as to make it more practical to conduct the crankcase fumes to the mixing chamber 2 by a connection to the oil fill tube cap 4. In such cases, the plug screw 16 (see FIG. 10) is replaced by the inlet or check valve end 9 of the check and metering valve unit 3, the metering valve end thereof being connected to the inlet port 6 of the mixing chamber 2 by a hose 56, it being noted that the use of hoses 45 and 56 permit the cap to be removed from the oil fill tube for oil replenishment. The outlet end of the mixing chamber is connected to the intake manifold by the hose 54. The tube 53 between the exhaust manifold and mixing chamber port 6' is also arranged as in the first described embodiment. The action of the device, as thus installed, is the same as of the arrangement shown in FIG. 1 and hence need not be repeated here.

In older engines, having badly worn cylinders and piston rings, the volume of "blow-by" gases entering the crankcase may be so great as to make it advisable to reverse the connections to the mixing chamber 2 as shown in FIG. 3. In this arrangement, the check valve end of the metering and check valve unit 3 is connected to the road draft tube orifice and a hose 57 connects the metering valve end thereof with hose nipple 21 which has been fitted into the orifice 6'. The tube 53' carrying exhaust gases to the mixing chamber is connected to the port 6 with the interposed metering valve 22' which may be the metering valve portion of the metering valve and check valve component 3 with the reduced diameter portion 32 removed. Alternatively, as indicated in dotted lines, if the engine design makes it more practical, the crankcase fumes may be conducted to the mixing chamber by a hose leading from the oil fill tube cap 4 in the same manner as by the tube 56 in the arrangement shown in FIG. 2, the only difference being the connection thereof to the port 6'. Obviously, the metering and check valve unit 3 can be positioned either horizontally or vertically as shown or, in fact, in any other attitude.

The embodiment shown in FIGS. 1, 2 and 3 relate primarily to modes of application of the invention to existing engines. FIG. 4 shows a representative mode of incorporating the invention into new engines, it being understood that even on new engines the mode of installation shown in the preceding figures to be employed if desired. In the embodiment shown in FIG. 4, the intake manifold F is provided with an opening surrounded by a bolting flange 58 and the outlet or discharge end of the mixing chamber 2a is provided with a companion flange 59 secured to the flange 58 by screws 60, said companion flange 59 being formed integrally with the body of the mixing chamber 2a and the opening in the side wall of the intake manifold inwardly of the periphery of the flange 58 being sufficiently smaller than the inside diameter of the mixing chamber 2a to serve as the substitute for the top 7 in cooperating with the end 20 of the diffusing member 19. Since except for the above differences in construction, the mixing chamber 2a is the same as the mixing chamber 2, the inlet ports and interior parts have been given the same numbers as in the preceding figures. The discharge end of the check valve and metering unit 3 is externally threaded as at 25 to engage the internally threaded end of the diffuser element shank 18 and the inlet end thereof comprises the hose nipple 10 connected by a hose 61 to a hose nipple 62 attached to the elbow 51. Alternatively, as in FIGS. 2 and 3, this hose could extend from the oil fill cap 4 if the construction of the engine made such connection more practicable. The exhaust gas tube 63 is shown extending from the exhaust manifold to the port 6'. As the engine develops wear, the connections of the hose 61 and tube 63 to the mixing chamber can, of course, be reversed in accordance with the teaching of FIG. 3.

For those instances in which a less efficient embodiment of the invention is deemed satisfactory at a reduced cost to the user, the expedients shown in FIGS. 12 or 13 may be employed. These embodiments are admittedly not as efficient as the previously described embodiments but do effect satisfactory results. In the embodiment shown in FIG. 12, the mixing chamber 2 is dispensed with and a T-fitting 64 has one end thereof connected to a nipple 65 projecting from the intake manifold F. The other end of the T is provided with a hose nipple 66 which is connected by a hose 67 to the outlet end of the check valve and metering valve unit 3 having the threaded inlet end thereof connected to the road draft tube opening by the elbow fitting 51. A coiled metal tube 68 extends between the exhaust manifold and the side entrance of the T with a second valve unit 3 interposed therein to take the place of the adjustment afforded by adjustment of the diffusing element in the mixing chamber 2, said valve unit having the check ball 36 removed therefrom as being unnecessary in that particular installation. FIG. 13 differs from that shown in FIG. 12 only in that the tube 68' leading from the exhaust is ported directly into the intake manifold and the hose 67' leading from the crankcase is similarly separately ported into the intake manifold. As above stated, neither of these embodiments is as satisfactory as those employing the mixing chamber but are cheaper to install.

In normal operation of the device in all of the various embodiments thus illustrated, the check ball 36, being of extremely light weight, is held seated against the seat 33 as shown in FIG. 5 due to the passage of fumes from the crankcase to the intake manifold through either the mixing chamber 2 or the T-fitting 64. If, however, there should be a backfire in the intake manifold, this ball is immediately lodged against the seat 35 preventing any back pressure or flame from reaching the crankcase.

With regard to the check ball 44 in the oil fill tube cap 4, this ball normally remains seated due to the fact that the crankcase is normally subjected to vacuum during normal engine operation by reason of the connection to the intake manifold, the amount of said vacuum being determined by the adjustment of the valve 27 and it being desirable that the vacuum thus imposed on the crankcase be sufficient only to insure that any fumes created therein will be immediately conducted to the intake manifold to prevent contamination of crankcase lubricant and resultant damage to lubricated parts therein. If, for any reason, the crankcase should develop a positive pressure greater than some predetermined pressure, the ball 44 will be displaced and the pressure relieved by passage through the tube 45 to the downstream side of the air filter and thus into the air-fuel mixture. By thus being conducted past the filter unit, the unit cannot be contaminated by the vapor thus conducted. Also, as is the case with the check ball 36, the ball 44, in the event of backfire, prevents any possibility of reverse flow or flame being conducted to the crankcase.

Continued tests of the above device installed on motor vehicles has shown a definite improvement in engine performance. As in my said prior patent, there is complete control and utilization of crankcase fumes and as above indicated in the report cited, the exhaust of engines equipped with this device is characterized by a most significant reduction in the most harmful of air pollutants deriving from motor vehicle exhaust emissions. Other observations of the results of the use of this device have included the significant reduction of deposited solids in the combustion chamber or on the valves of the engine, a significant reduction of piston ring and cylinder wear, increased power using lower octane fuel, inhibition of the formation of sludge in the lubricating oil, reduction of the amount of moisture in the exhaust emissions with coincident reduction of the rate of muffler deterioration and last, but by no means least, the fact that the device has no air entrance opening which may become plugged up and inhibit the operation of the device, this being a characteristic of forms of devices for the same purpose as the present invention which involve positive crankcase ventilation.

From the results indicated by repeated tests and analysis of the exhaust gases of engines equipped with devices of the present invention, it is evident that there is a difference in the thermo-chemical reactions which take place in the combustion chambers of engines so equipped as compared with engines not so equipped. What these differences are and why they occur is not known but the results above specified are known. It is believed that these differences may have some relation to the fact that with engines equipped with the present invention no new oxygen is added to the air-fuel mixture except such as is present in the air drawn into the carburetor through the air filter. The crankcase being closed against the entrance of air, no additional oxygen is added to the air-fuel mixture from that source. If any oxygen is present in the "blow-by" gases, that is oxygen which has been initially received through the air filter and carburetor. This may tend to produce a condition in which the oxygen thus introduced into the air-fuel mixture is more completely consumed by combination with the hydrocarbon fuel leaving less of the oxygen to be combined with the nitrogen which is resultantly present by reason of the consumption of the oxygen.

It should be stated, that the device has been used with some success where at least some air has been allowed to enter the crankcase of the engine as by reason of leaving out the oil fill tube cap or by failure to tightly close the dip stick opening in the crankcase. The results are not as good as those deriving from a completely sealed crankcase although there is some reduction in the amount of smog producing exhaust pollutants as compared with the exhaust of an engine not equipped with the device.

While in the foregoing specification certain presently preferred embodiments of the invention have been disclosed, such disclosure has been by way of example and accordingly it will be understood that the invention is not to be deemed to be limited to the precise details of construction thus disclosed and that it includes as well, all such changes and modifications in the parts and in the construction, combination and arrangement of parts as shall come within the purview of the appended claims.

I claim:

1. In an internal-combustion engine, having a combustion chamber served by intake manifold means, including a carburetor, and by an exhaust means for disposing of the products of combustion and further having a crankcase housing a rotatable crankshaft operatively interconnected with a reciprocating piston and connecting rod means, the combination of means constantly operative to prevent the emission of crankcase fumes to atmosphere and comprising means sealing the crankcase against the entrance of air and airborne matter into the crankcase, conduit means connecting the interior of the crankcase with the intake manifold means operative in response to negative pressure in the intake manifold means to maintain a negative pressure in the crankcase by evacuation of fumes formed in the crankcase to the intake manifold means, other conduit means extending from the exhaust means operative to add a portion of the exhaust gases from the exhaust means to the air-fuel mixture and the crankcase fumes in the intake manifold means, and a check valve interposed in said first named conduit means at a point therein between the interior of the crankcase and a point at which exhaust gases are added to the crankcase fumes by said other conduit means, said check valve being constantly effective to prevent flow from said first named conduit means into the crankcase.

2. An internal-combustion engine as claimed in claim 1 in which said other conduit means includes a metal tube arranged into a coil to afford a heat dissipating area effective to lower the heat of the said portion of exhaust gases prior to the introduction thereof into combination with the air-fuel mixture in the intake manifold means.

3. An internal-combustion engine as claimedin claim 1 in which said conduit means for crankcase fumes and said portion of exhaust gases each include means for varying the proportions of fumes and gases carried thereby.

4. An internal-combustion engine as claimed in claim 1 in which said conduit for conducting said crankcase fumes and said conduit means for conducting said portion of exhaust gases are separately connected to said intake manifold means.

5. An internal-combustion engine as claimed in claim 1 which includes a mixing chamber device having inlet port means and outlet port means, in which said conduit means for said crankcase fumes and said exhaust gases are separately connected to said inlet port means of said mixing chamber device, and in which the outlet port means of said mixing chamber device is connected for the flow of gas and fumes therefrom into the intake manifold means.

6. An internal-combustion engine as claimed in claim 1 in which said crankcase is provided with a tube means having a removable cover and through which tube means replenishment of lubricating oil is effected, in which said removable cover is provided with a normally closed check valve capable of being caused to open in the presence of a positive pressure in the crankcase of a predetermined magnitude greater than the existing atmospheric pressure, and in which said removable cover downstream of said check valve is connected by conduit means with the intake manifold means operative to return any fumes from the crankcase caused to pass said check valve to the intake manifold means.

7. An internal-combustion engine as claimed in claim 1 in which the crankcase is provided with a tube means through which lubricating oil is replenished and in which said conduit through which crankcase fumes are evacuated has the intake end thereof disposed in communication with said oil replenishing tube means.

8. In an internal-combustion engine, having a combustion chamber served by intake manifold means, including a carburetor, and by an exhaust means for disposing of the products of combustion and further having a crankcase housing a rotatable crankshaft operatively interconnected with a reciprocating piston and connecting rod means, the combination of means constantly operative to prevent the emission of crankcase fumes to atmosphere comprising means sealing the crankcase against the entrance of air and airborne matter into the crankcase, a mixing chamber device comprising a hollow body having an end wall provided with an outlet port, a second end wall provided with a first inlet port, and a side wall having a second inlet port, means connecting said outlet port with the intake manifold means, conduit means connecting the interior of the crankcase with one of said mixing chamber device inlet ports, other conduit means connecting the exhaust means with the other of said mixing chamber device inlet ports and effective to transmit a portion of the exhaust gases to the interior of said mixing chamber device, and a check valve interposed in said conduit means connecting the interior of the crankcase with an inlet port on said mixing chamber device and operatively constantly to prevent the flow of gas or fumes therethrough into the crankcase.

9. An internal-combustion engine as claimed in claim 8 in which one of said inlet ports of said mixing chamber device carries adjustable means for varying the rate of flow of material received through the other of said inlet ports.

10. An internal-combustion engine as claimed in claim 8 in which said conduit means extending from said exhaust means comprises a metal tube of greater length than the distance between the points of connection thereof to said exhaust means and to said mixing chamber device affording an area for heat exchange with atmosphere whereby the exhaust gases received therein are reduced in temperature before entering said mixing chamber device.

11. An internal-combustion engine as claimed in claim 8 in which said mixing chamber device includes a body member having spaced parallel end walls and a side wall, in which one of said end walls carries the outlet port of said mixing chamber device, the other of said end walls carries a first inlet port and the side wall carries a second inlet port.

12. An internal-combustion engine as claimed in claim 11 in which said first inlet port of said mixing chamber device carries means adjustable to vary the rate of flow of gases received through said second inlet port.

13. An internal-combustion engine as claimed in claim 11 in which said conduit means connected to the interior of the crankcase is connected to said first inlet port of said mixing chamber device and in which said other conduit means is connected to said second inlet port thereof.

14. An internal-combustion engine as claimed in claim 11 in which said conduit means connected to the interior of the crankcase is connected to said inlet port in the side wall of said mixing chamber device body member, and in which said other conduit means is connected to said inlet port in an end wall of said mixing device body member.

15. An internal-combustion engine as claimed in claim 11 in which the engine includes a tube means through which lubricating oil is supplied to the moving parts in the crankcase, and in which said conduit means connected to the interior of the crankcase is placed in communication with said tube means.

16. An internal-combustion engine as claimed in claim 15 in which said tube means is provided with a removable cover affording access for oil supply to the crankcase and in which said conduit means connected to the crankcase interior is connected to means extending through said cap for the said connection thereof with the interior of the crankcase.

17. In an internal-combustion engine, having a combustion chamber served by intake manifold means, including a carburetor, and by an exhaust means for disposing of the products of combustion other than those escaping past the engine piston and further having a crankcase housing a rotatable crankcase operatively connected with a reciprocating piston and connecting rod means, the combination of means constantly operative to prevent the emission of crankcase fumes to atmosphere and to limit the entrance of air into the combustion chamber of the engine to that which enters the intake of the carburetor, said devices including means sealing the crankcase against the entrance of air and airborne matter into the crankcase, conduit means connecting the interior of the crankcase with the intake manifold means operative in response to negative pressure in the intake manifold means to maintain a negative pressure in the crankcase by evacuation of fumes formed in the crankcase to the intake manifold means, and other conduit means extending from the exhaust means operative to add a portion of the exhaust gases from the exhaust means together with evacuated crankcase fumes to the air-fuel mixture in the intake manifold means.

18. An internal-combustion engine as claimed in claim 17 in which said conduit means for crankcase fumes and said portion of exhaust gases each include means for varying the proportions of fumes and gases carried thereby.

References Cited
UNITED STATES PATENTS

| | | | |
|---|---|---|---|
| 3,059,628 | 10/1962 | Linn | 123—119 |
| 3,108,581 | 10/1963 | Humphreys | 123—119 |
| 3,145,697 | 8/1964 | Barr | 123—119 |
| 3,224,188 | 12/1965 | Barlow | 123—119 X |
| 3,279,444 | 10/1966 | Leasure | 123—41.86 |

RALPH D. BLAKESLEE, Primary Examiner.

MARK NEWMAN, Examiner.

UNITED STATES PATENT OFFICE
CERTIFICATE OF CORRECTION

Patent No. 3,362,386                      January 9, 1968

Robert E. McMahon

It is hereby certified that error appears in the above numbered patent requiring correction and that the said Letters Patent should read as corrected below.

Column 12, line 33, for "crankcase" read -- crankshaft --.

Signed and sealed this 25th day of February 1969.

(SEAL)
Attest:

Edward M. Fletcher, Jr.                      EDWARD J. BRENNER
Attesting Officer                              Commissioner of Patents